United States Patent [19]

Fournier et al.

[11] Patent Number: 5,320,698
[45] Date of Patent: Jun. 14, 1994

[54] METHOD OF SPLICING A PRESSURE SENSITIVE LAMINATE

[75] Inventors: Richard L. Fournier, Scarborough; Robert C. Margiloff, Westbrook, both of Me.

[73] Assignee: S. D. Warren Company, Philadelphia, Pa.

[21] Appl. No.: 83,800

[22] Filed: Jun. 28, 1993

[51] Int. Cl.⁵ .............................................. B65H 69/06
[52] U.S. Cl. .................................... 156/159; 156/249; 156/258; 156/289; 156/304.1; 156/304.3; 428/40; 428/57; 428/60; 428/61
[58] Field of Search .................. 156/157, 159, 304.1, 156/304.3, 304.5, 249, 258, 289, 505; 428/40, 42, 37, 58, 60, 61

[56] References Cited

U.S. PATENT DOCUMENTS

| | | |
|---|---|---|
| 2,386,344 | 10/1945 | Roesen . |
| 2,726,222 | 12/1955 | Palmquist et al. ............... 156/159 X |
| 3,121,649 | 2/1964 | Oliver ................................ 156/289 X |
| 3,616,109 | 10/1971 | Miro et al. ........................... 428/53 |
| 3,741,079 | 6/1973 | Bossons et al. . |
| 4,009,065 | 2/1977 | Mikulas ............................... 156/159 |
| 4,090,003 | 5/1978 | Pierson ............................... 156/249 X |
| 4,464,215 | 8/1984 | Cogliano ......................... 156/304.3 X |
| 4,526,638 | 7/1985 | Clements . |
| 5,006,191 | 4/1991 | Schmidt ......................... 156/304.5 X |
| 5,039,374 | 8/1991 | Winter . |

*Primary Examiner*—David A. Simmons
*Assistant Examiner*—Mark A. Osele
*Attorney, Agent, or Firm*—R. D. Vickrey; J. W. Kane, Jr.; F. M. DiBiase

[57] ABSTRACT

Disclosed is a novel process for splicing webs of pressure sensitive laminate material. When webs of pressure sensitive laminates are spliced by conventional methods and wound into rolls, the resultant splices must be located and removed when the roll is later converted into pressure sensitive products. The novel splice is achieved by eliminating the top tape used in a conventional splice and overlapping a face sheet of one laminate web over the other laminate web to join the webs. For many processes, this novel splice is printable and does not have to be edited out, and it is at least as strong as those made with tapes. Also disclosed is a novel spliced pressure sensitive laminate.

12 Claims, 3 Drawing Sheets

METHOD OF SPLICING A PRESSURE SENSITIVE LAMINATE

TECHNICAL FIELD

The invention relates generally to splicing or connecting webs of material and more particularly to splicing webs of pressure sensitive laminate material.

BACKGROUND ART

The present invention is directed to a novel splice and to a method of splicing together two webs of pressure sensitive laminate material. The invention uniquely enhances the quality and rate of conversion of laminate stock before die cutting to matrix-stripped laminated stock.

The following definitions will be helpful to facilitate understanding of the invention:

Release liner: usually paper that has been treated with a silicone release agent.

Face sheet: usually paper, foil or film.

Pressure sensitive adhesive: an adhesive which can be formulated to provide varying degrees of removability from surfaces to which it is applied.

Pressure sensitive laminate: a combination of a release liner with a face sheet temporarily adhered to it by means of a pressure sensitive adhesive. When the face sheet is stripped from the release liner, the pressure sensitive adhesive permanently adheres to the face sheet.

Die cutting: the process of cutting through the face sheet only of a pressure sensitive laminate in a desired pattern to form labels and the like.

Matrix or Lace: the area of face sheet surrounding the die cut desired pattern (e.g., labels) that is stripped away after the die cutting operation to leave matrix-stripped laminate stock with labels remaining on the release liner.

The prior art can be described with reference to FIGS. 1, 2, 3 and 4.

In FIG. 1 a conventional pressure sensitive laminate 10, is shown in cross-section. This laminate 10 is prepared by bringing together a face sheet 14 with a release liner 12 that has been coated with a pressure sensitive adhesive 16.

In the preparation of products such as labels, referring to FIG. 2, parent roll 18 of laminate 10 before die cutting is cut by die cutting apparatus 20 (illustrated schematically) which cuts through face sheet 14 but not release liner 12. Following the die cutting operation a matrix of face sheet 14 is stripped away from release liner 12 with holes 22 where the die cut labels 24 have been cut and are left intact on release liner 12.

The parent rolls of laminate 10 before die cutting are manufactured in a laminating process into intermediate parent rolls of various lengths. These intermediate parent rolls are then rewound and slit into final parent rolls for die cutting at the widths and lengths ordered by the customer. In the rewinding process it is often necessary to make splices to satisfy customer length requirements and to remove defects in the parent rolls. A conventional splice of this nature is depicted in FIG. 3 (in cross-section) and in FIG. 4. FIG. 3 shows a conventional butt-type splice for pressure sensitive laminates. This splice is prepared by butting the expiring end of laminate 10b against the leading end of laminate 10a at the butt line 26. The splice has five layers which consist of three splicing tapes plus a face sheet and a release liner.

Splicing tape 28 is applied on the butt line 26 transversely across the width of the webs on the release liner side. A clear tape 30 is applied on the butt line 26 transversely across the width of the webs between the release liners 12a and 12b and the face sheets 14a and 14b. The purpose of tape 30 between the face sheets and the release liners is to prevent adhesive of tape 28 from working its way up through the gap between the two abutting release liners and sticking to the adhesive 16 on the back side of face sheets 14a and 14b. If the two adhesive layers were to contact each other and adhere, the face sheet's matrix would break during die cutting. Lastly, splicing tape 32 is applied on the butt line 26 transversely across the width of the webs on the face sheets 14a and 14b.

FIG. 4 is an overhead view of the face sheet surface of laminates 10a and 10b showing splicing tape 32 extending diagonally across the face sheets. Splicing tape 32 must have good adhesive strength to form the splice and the backing must have good internal strength to maintain the splice through the various converting operations in which the web will be subjected. For this reason paper tapes are usually not adequate. Tapes that normally provide the required strength are plastic tapes.

As one examines the conventional splice, it is apparent that it is not suitable to go through the conversion process and end up as part of the finished product. Splicing tape 32 joining the face sheets of laminated webs 10a and 10b is typically of a different material and color than the two face sheets. Thus, the tape represents a significant change in surface quality, printability and/or other functionality.

Another disadvantage is that the conventional splice has less than maximum strength to offset stresses that could pull apart the joined webs when they are subjected to high shear forces. As shown in FIG. 3, the laminate 10 is cut all the way through with the cuts in the face sheet and the release liner being aligned. If either the face sheet or the release liner separates, due to a poorly made splice or excessive tension, the other web will most likely separate, as well. Also, the face sheet tape in the typical splice straddles both face sheets, with approximately half of the tape on one face sheet web and one half on the other. To separate the two webs, the tape must slide across the face sheet a distance of only half the width of the tape. Thus, the typical butt-type splice lacks maximum resistance to shear forces when the spliced web is pulled through a winding or unwinding operation.

DISCLOSURE OF THE INVENTION

The present invention avoids the problems of the prior art by a novel splicing process in which the laminates to be spliced are trimmed in such a way that one of the face sheets overlaps the other face sheet. There is no need for a splicing tape across the face sheets and in most embodiments the tape between the release liners and face sheets can be eliminated.

The present invention in a preferred embodiment is a method of splicing a first pressure sensitive laminate to a second pressure sensitive laminate comprising:

A. making a first cut through the entire thickness of the first laminate across its entire width;

B. making a second cut through only the release liner of the first laminate across its entire width parallel to the first cut so as to leave a portion of the face sheet extending beyond the release liner;

C. making a third cut through the entire thickness of the second laminate across its entire width so as to permit continuous abutment of the cut ends of the first and second release liners;

D. butting together the cut ends of the first and second release liners in a continuous abutment across their entire widths; and E. pressing the part of the first face sheet which extends beyond the first release liner onto the top of the second face sheet to permanently adhere the first and second face sheets together.

BEST MODE FOR CARRYING OUT THE INVENTION

Figure 5:
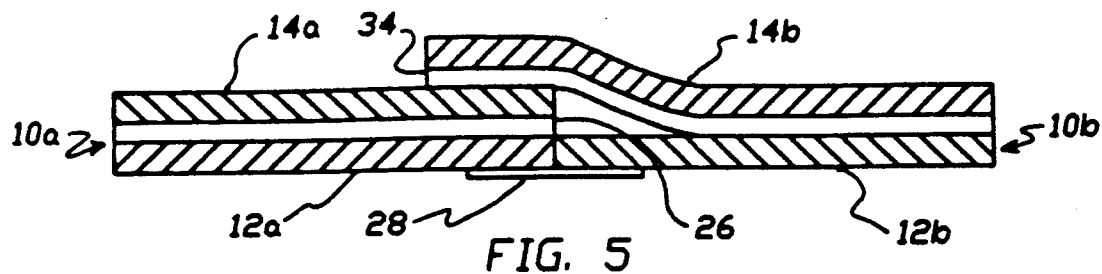
FIG. 5 is a cross section view of webs as shown in FIG. 6 of pressure sensitive adhesive laminate that have been spliced by the process of the invention.

FIG. 5 depicts a preferred embodiment of the invention. It incorporates the use of face sheet 14b of an expiring pressure sensitive laminate web 10b to overlap face sheet 14a of a new or oncoming pressure sensitive laminate web 10a and form the splice of the invention. The process of making the splice can be done on a table wide enough to accommodate the widths of the webs to be spliced. The table has slots on its surface which are also wide enough to accommodate the width of the webs. The slots are diagonal with respect to the table. There are three slots 1 inch apart. The purpose of the slots is to make clean uniform cuts in the web materials by placing the webs 10 as desired over the slots and then positioning a knife in the slot and drawing it across the web to make the diagonal cut.

The expiring end of laminate 10b is placed over the middle slot on the splicing table. The knife is placed in the slot and drawn across laminate 10b, cleanly cutting both face sheet 14b and release liner 12b of the expiring end of laminate 10b to the same length. The trim from the cut is discarded. The leading end of new laminate 10a is pulled onto the splicing table over laminate 10b and beyond the middle cutting slot. Once again, a knife is positioned in the middle slot and drawn across the laminates 10a and 10b. The trim from laminate 10a is discarded. With laminate 10b still in the same position, face sheet 14b is peeled back. Laminate 10a is then pulled over the middle slot, over release liner 12b and over and beyond the next slot which is 1 inch away from the middle slot. With the laminates in this position over the next slot, a knife is positioned in the slot and a cut is made across laminate 10a and release liner 12b. Waste trim from laminate 10a and release liner 12b is discarded.

Release liner 12b is now shorter than the face sheet 14b of laminate 10b by 1 inch. With face sheet 14b of laminate 10b still in the rolled back position, laminate 10a is butted up against laminate 10b and the two laminates are joined by tape 28 on their release liner side. A particularly useful tape for this purpose is 3M Scotch Brand 850 polyester film tape colored red. As mentioned earlier, migration of the adhesive on tape 28 to the face sheets 14a and 14b can present problems in the conversion process. For this reason, it is preferable to detackify any exposed tape adhesive on butt line 26. A preferred embodiment uses a waterproof permanent marking stick that contains glycol ether solvents. This marker is manufactured by Sanford Corporation as the Sanford Mean Streak. To detackify the tape adhesive, the marker is simply drawn across the entire width of the butt line 26.

Figure 1:
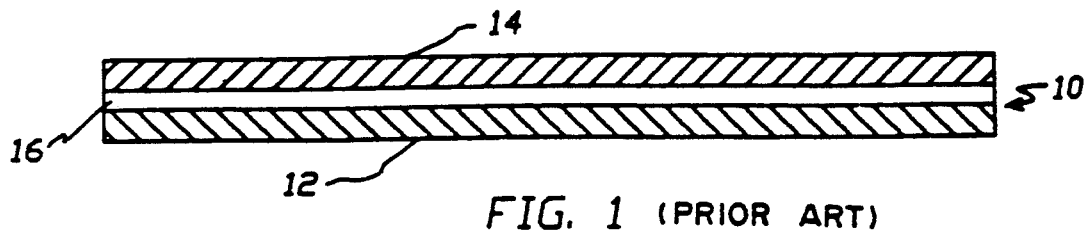
FIG. 1 is a cross section view of a conventional pressure sensitive adhesive laminate.
Figure 2:
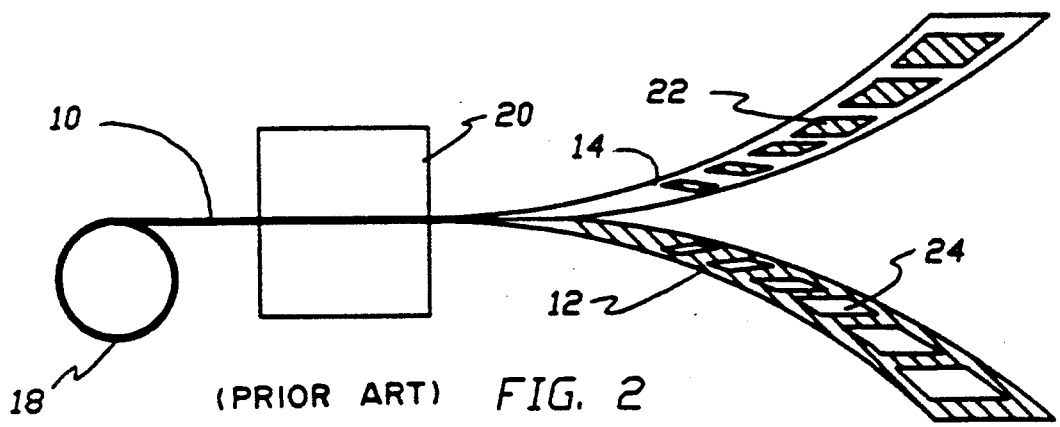
FIG. 2 is a schematic representation of a pressure sensitive adhesive laminate being unwound from a reel and advancing through a die cutting and stripping operation.
Figure 3:
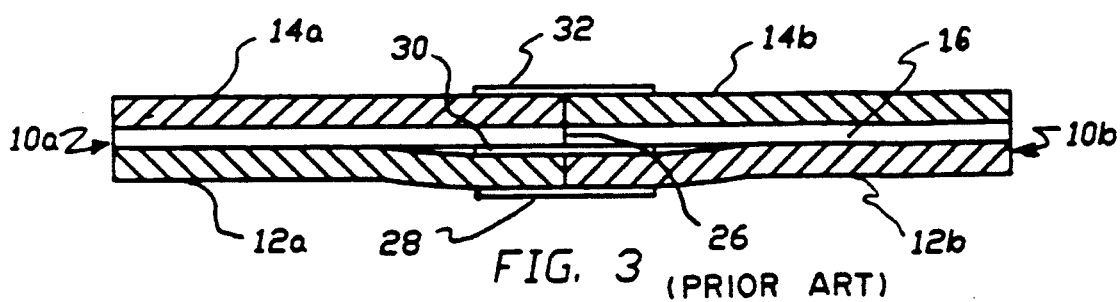
FIG. 3 is a cross section view as shown in FIG. 4 of webs of pressure sensitive adhesive laminate that have been conventionally spliced.
Figure 4:
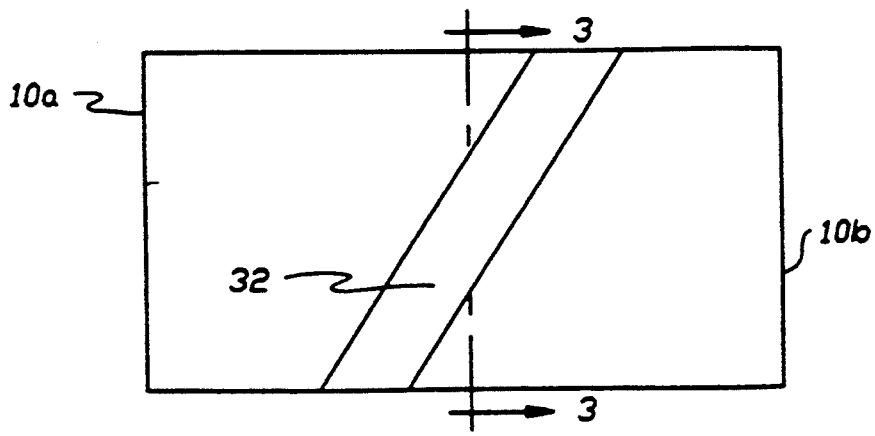
FIG. 4 is an overhead view of webs of pressure sensitive adhesive laminate that have been conventionally spliced.

Face sheet 14a remains on release liner 12a. The final step 10b from its peeled back position. Face sheet 14b of laminate 10b is now 1 inch longer than release liner 12b of laminate 10b, consequently in the process of returning it, it overlaps face sheet 14a of laminate 10a 1 inch and serves the same purpose, but better, as top splicing tape 32 shown in FIG. 3.

Figure 6:
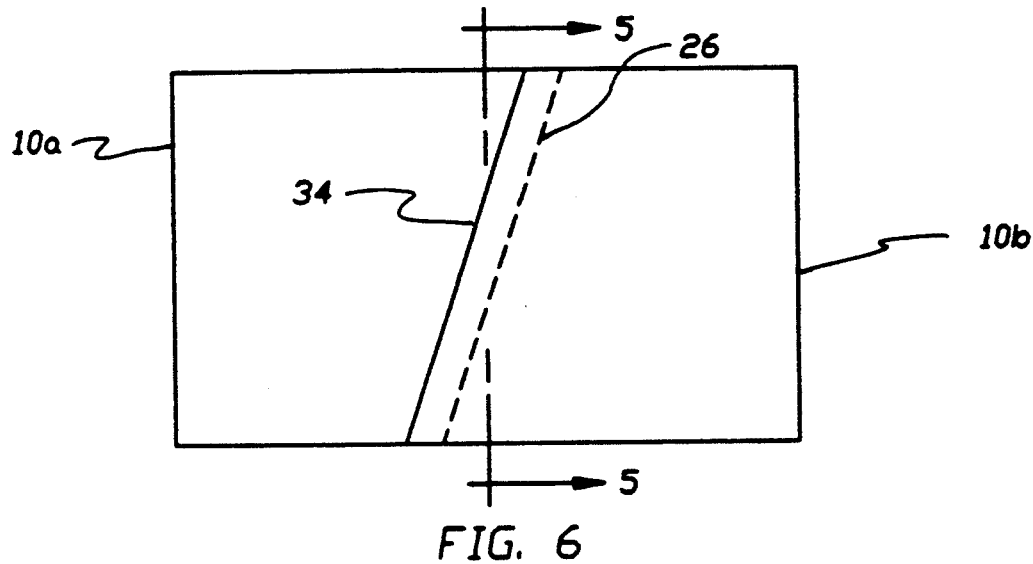
FIG. 6 is an overhead view of webs of pressure sensitive adhesive laminate that have been spliced by the process of the invention.

The resultant overlapped face sheet splice is printable for most printing processes and identical to the two face sheets being joined. It offers more resistance to shear forces than the standard tape splice. There is only one exposed face sheet edge 34 as illustrated as FIGS. 5 and 6. Butt line 26 is also shown in FIG. 6. It is along this line that detackifier is applied prior to overlapping face sheet 14b on face sheet 14a.

Figure 7:
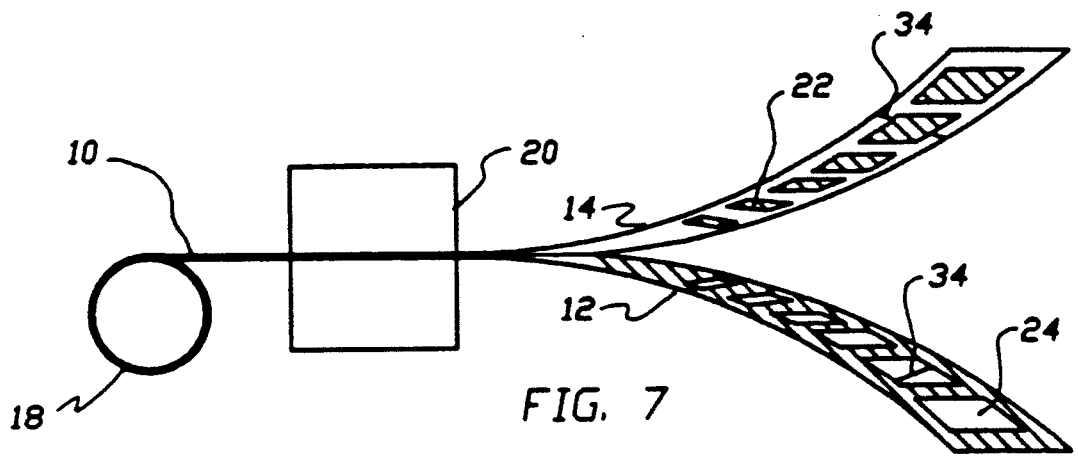
FIG. 7 is a schematic representation of a section of a web of pressure sensitive adhesive laminate containing a splice made by the process of the invention as it exits from a die cutting operation.

FIG. 7 depicts in general the splice of the invention going through the die cutting operation and stripping operation. The cohesive strength of the splice is strong enough to withstand the shear force imposed in the converting operation. The matrix with cut out holes 22 strips cleanly from release liner 12 even in those areas containing the overlap splice 34, leaving die cut labels 24 on release liner 12 intact.

For the face sheet, paper is commonly used in the manufacture of labels. This will likely be a web of papermaking fibers that can be sized and then top coated with a composition containing pigment and adhesive to provide printing properties. There are other materials which can be used in place of paper where special use or decorative effects are desired. Typical examples are plastic film materials and foils.

The release liner will be a material that inherently has release properties or a material that can be treated so that release properties are imparted to it. Certain plastic films such as polyethylene films fall in the first category. Since release liners are usually discarded once they have served their purpose of supporting the face sheet material, an economical release liner is usually preferred. Especially suitable is paper that has been highly refined, surface sized and then siliconized.

There are numerous materials that can be used to detackify or deaden the exposed adhesive of the splicing tape used on the exterior surfaces of the release liners. After the two release liners are joined by the splicing tape, any of the following materials can be run along the seam where the two liners abut:

A. Silicone or silicone compounds;
B. Wax (e.g. crayon wax, candle wax, canning wax);
C. Marking pens (e.g. Mighty Mark 7000 by Faber-Castell Corp.; Mean Streak by Sanford Corporation);
D. Oil based paint markers (e.g. are Brite-Mark, Pigment-O-Mark, Paint Marker and Dalo Marker, all manufactured by Mark-Tex Corporation; also Nissen Feltip Paint marker by John P. Nissen, Jr.)

Alternative embodiments of the invention are shown in FIGS. 8, 9, 10 and 11. All of the following embodiments exhibit the basic advantages of the overlapped splice, that is, printability for most processes and resistance to shear forces in the converting operations except the embodiment of FIG. 11 which will be explained. All of the embodiments are cross section views, similar to that shown in FIG. 5.

Figure 8:
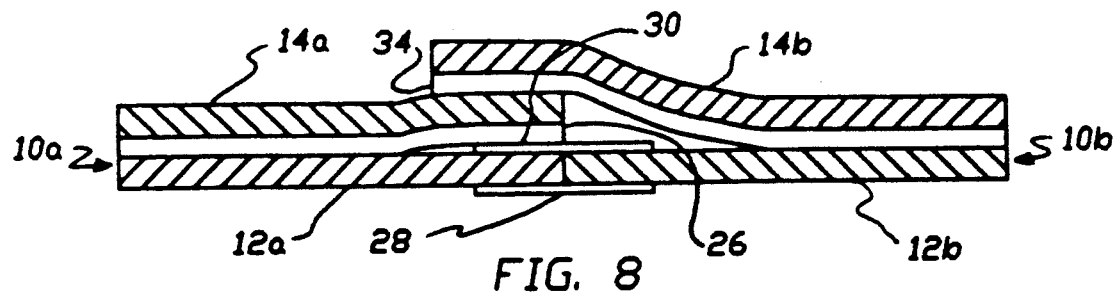
FIGS. 8, 9, 10 and 11 are alternative embodiments of the splice of the invention as shown in cross section on FIG. 6.

FIG. 8 represents an embodiment similar to FIG. 5. In FIG. 8 a middle tape 30 is applied along the butt line 26 of the release liners 12a and 12b for the purpose of detackification. The overlapped face sheet splice is prepared in the same manner as that of FIG. 5.

Figure 9:
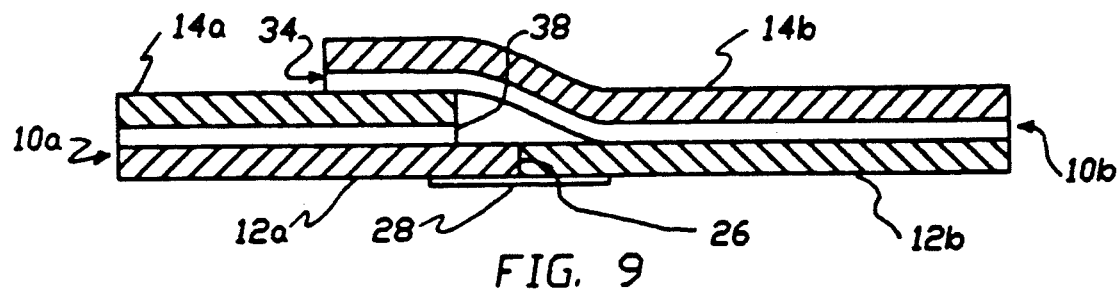

FIG. 9 depicts an overlapped face sheet splice with a staggered release liner splice using only a bottom tape 28. This splice has the advantage of being no more than three layers thick at the splice, however, it requires an extra step in its preparation. At the butt line 26 of the release liners 12a and 12b, face sheet 14b is prepared so that it is longer than the extension of release liner 12a (that portion extending beyond cut 38 of face sheet 14a). The length of face sheet 14b and release liner 12a extension can be varied but generally they will tend to be about 1 inch for face sheet 14b and about ½ inch for extension of release liner 12a. Detackifier is used in this embodiment.

Figure 10:
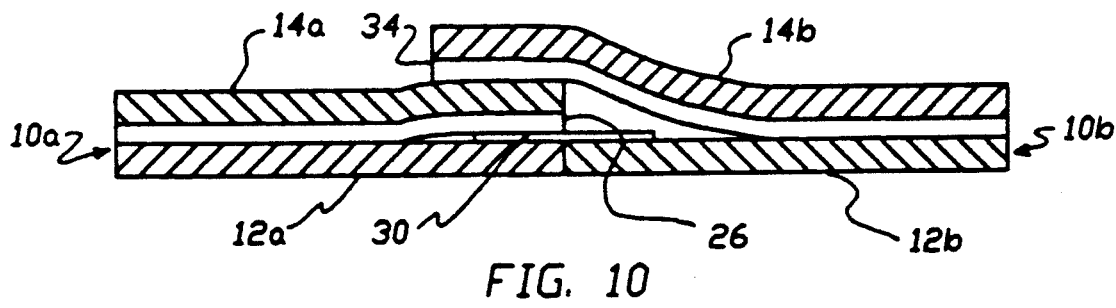

FIG. 10 represents another embodiment of the invention. This embodiment is similar to the preferred embodiment depicted in FIG 5. However, in this version no bottom tape and no detackifier are used. Instead a middle tape 30 is used along the butt line 26 between release liners 12a and 12b and face sheets 14a and 14b. Face sheet 14b overlaps middle tape 30 and face sheet 14a to complete the overlapped splice. Middle tape 30 has a silicone film on the top surface and a silicone adhesive on the bottom surface. This type of tape is necessary in order for the silicone adhesive to adhere to release liners 12a and 12b and for the silicone film to provide the same type of release properties as release liners 12a and 12b to allow stripping of the face sheets 14a and 14b at the appropriate time.

Figure 11:
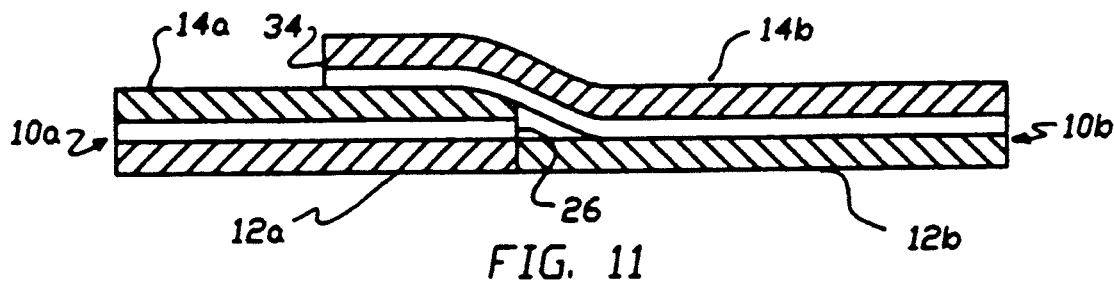

FIG. 11 represents the simplest, but least preferred, embodiment of the invention. In this embodiment no tape whatsoever is used and no detackifier is used. Release liner 12b of expiring laminate 10b is trimmed so that it is 1 inch shorter than face sheet 14b. When laminates 10a and 10b are butted together, the 1 inch extension of face sheet 14b is overlapped on face sheet 14a. While the splice of this embodiment does not have the strength and resistance to shear forces as the other embodiments, it is printable, has minimum caliper and does not have to be culled out.

The embodiments presented here all include splices in which the ends of the release liners are trimmed and in close abutment. The invention can also be carried out with untrimmed release liner ends and/or with varying widths of gap between the abutting release liner ends. However as a consequence of not trimming the release liner ends, or of increasing the gap between the release liner ends, a larger adhesive area of the bottom splicing tape is exposed at the gap that must be detackified. Although detackification can be carried out by the methods described herein, such as by wax crayon or a middle splicing tape, it is not as practical or convenient as when the release liner ends are trimmed and in close proximity.

The overlap of expiring face sheet 14b on oncoming face sheet 14a has been described in its preferred length of about 1 inch. However, it could be shorter, as short as about ¼ inch, although with some risk of the splice coming apart during conversion. It can also be almost any length longer. However, because the additional length is generally unneeded and adds to cost, a length in excess of 6 inches is discouraged.

The embodiments described herein all include face sheet 14b of the expiring laminate web 10b overlapping face sheet 14a of the oncoming laminate web 10a. However, the invention also includes the mirror image arrangement wherein face sheet 14a of the oncoming laminate web 10a overlaps face sheet 14b of the expiring laminate web 10b.

What is claimed is:

1. A method of splicing a first pressure sensitive laminate to a second pressure sensitive laminate, wherein each pressure sensitive laminate comprises, from top to bottom, a face sheet, a coating of pressure sensitive adhesive permanently adhered to the face sheet, and a release liner, the method comprising:

A. making a first cut through the entire thickness of the first laminate across its entire width;
B. making a second cut through only the release liner of the first laminate across its entire width parallel to the first cut so as to leave a portion of the face sheet extending beyond the release liner;
C. making a third cut through the entire thickness of the second laminate across its entire width so as to permit continuous abutment of the cut ends of the first and second release liners;
D. butting together the cut ends of the first and second release liners in a continuous abutment across their entire widths; and
E. pressing the part of the first face sheet which extends beyond the first release liner onto the top of the second face sheet to permanently adhere the first and second face sheets together.

2. The method of claim 1, further comprising:

F. making a fourth cut through only the second face sheet across its entire width parallel to the third cut so as to leave a portion of the second release ,liner extending beyond the second face sheet less than the amount which the first face sheet extends beyond the first release liner so that the first face sheet will overlap the second face sheet when the first and second release liners are butted together;
G. adhering a strip of splicing tape to the bottom of the release liner which overlaps and holds together the butted ends of the first and second release liners; and
H. applying detackifier material on top of the release liners at the abutment of their ends to prevent the face sheet from being permanently adhered to the adhesive on the tape beneath the abutment.

3. The method of claim 1, further comprising:

F. adhering with adhesive a strip of splicing tape to the bottom of the first and second release liners overlapping and holding together the butted ends of the first and second release liners; and G. applying detackifier material on top of the release liners at the abutment to prevent the first face sheet from being permanently adhered to the splicing tape adhesive beneath the abutment.

4. The method of claim 1, further comprising:

F. adhering with adhesive a strip of splicing tape to the bottom of the first and second release liners overlapping and holding together the butted ends of the first and second release liners; and G. adhering a strip of tape with a release surface on its top side to the top of the first and second release liners overlapping the butted ends to prevent the first face sheet from permanently adhering to the splicing tape adhesive beneath the abutment.

5. The method of claim 1, further comprising adhering to the top of the first and second release liners overlapping the butted ends a strip of splicing tape with a release surface on its top side and an adhesive on its bottom side which will permanently adhere to the top of the release liners, whereby the splicing tape holds the two release liners together.

6. The method of claim 1, wherein the portion of the first face sheet extending beyond the first release liner after step B. is at least about ¼ inch long.

7. A spliced pressure sensitive laminate comprising:

A. a first face sheet with a coating of pressure sensitive adhesive permanently adhered to its bottom and a cut end;

B. a first release liner on the top of which is temporarily adhered the first face sheet by the pressure sensitive adhesive, the first release liner having a cut end parallel to and shorter than the cut end of the first face sheet;

C. a second face sheet with a coating of pressure sensitive adhesive permanently adhered to its bottom and temporarily adhering it to the top of a second release liner, the second face sheet and second release liner having cut ends parallel to the cut end of the first release liner;

D. the cut end of the first release liner being abutted against the cut end of the second release liner;

E. the cut end of the first face sheet overlapping the cut end of the second face sheet and permanently adhered to it by the pressure sensitive adhesive.

8. The spliced pressure sensitive laminate of claim 7, wherein: (i) the cut end of the second face sheet is parallel to and shorter than the cut end of the second release liner, whereby a portion of the first face sheet is temporarily adhered to a portion of the second release liner: (ii) a strip of splicing tape is adhered to the bottom of both release liners and overlaps and holds together the butted ends of the release liners; and (iii) a detackifier material is on top of the release liners at the abutment of their ends to prevent the first face sheet from being permanently adhered to the adhesive on the tape beneath the abutment.

9. The spliced pressure sensitive laminate of claim 7, wherein: (i) the end of the second face sheet is cut the same length as the end of the second release liner; (ii) a strip of splicing tape is adhered to the bottom of both release liners and overlaps and holds together the butted ends of the release liners; and (iii) a detackifier material is on top of the release liners at the abutment of their ends to prevent the first face sheet from being permanently adhered to the adhesive on the tape beneath the abutment.

10. The spliced pressure sensitive laminate of claim 7, wherein: (i) the end of the second face sheet is cut the same length as the end of the second release liner; (ii) a strip of splicing tape is adhered to the bottom of both release liners and overlaps and holds together the butted ends of the release liners; and (iii) a strip of tape with a release surface on its top side is adhered to the top of the first and second release liners overlapping the butted ends to prevent the first face sheet from permanently adhering to the adhesive on the splicing tape beneath the abutment.

11. The spliced pressure sensitive laminate of claim 7, wherein: (i) the end of the second face sheet is cut the same length as the end of the second release liner; and (ii) a strip of splicing tape is adhered to the top of the first and second release liners overlapping the butted ends, the splicing tape having a release surface on its top side and an adhesive on its bottom side which is permanently adhered to the top of the release liner to hold the two release liners together.

12. The spliced pressure sensitive laminate of claim 7, wherein the portion of the first face sheet extending beyond the first release liner is at least about ¼ inch long.

* * * * *